US009358934B2

(12) United States Patent
Yu et al.

(10) Patent No.: US 9,358,934 B2
(45) Date of Patent: Jun. 7, 2016

(54) RETRACTABLE SPEAKER STRUCTURE FOR USE IN A VEHICLE

(71) Applicant: Hsin Chong Machinery Works Co. Ltd., Tao-Yuan (TW)

(72) Inventors: Yeh-Wen Yu, Tao-Yuan (TW); Shiu-Ming Lin, Tao-Yuan (TW)

(73) Assignee: HSIN CHONG MACHINERY WORKS CO. LTD., Tao-Yuan (TW)

(*) Notice: Subject to any disclaimer, the term of this patent is extended or adjusted under 35 U.S.C. 154(b) by 191 days.

(21) Appl. No.: 14/295,093

(22) Filed: Jun. 3, 2014

(65) Prior Publication Data

US 2015/0343961 A1 Dec. 3, 2015

(51) Int. Cl.
*B60R 11/02* (2006.01)
*B60R 11/00* (2006.01)

(52) U.S. Cl.
CPC ...... *B60R 11/0217* (2013.01); *B60R 2011/0082* (2013.01); *B60R 2011/0092* (2013.01); *H04R 2499/13* (2013.01)

(58) Field of Classification Search
CPC .... H04R 1/025; H04R 1/026; H04R 2499/13; H04R 2201/025; B60R 11/0217
See application file for complete search history.

(56) References Cited

U.S. PATENT DOCUMENTS 5,072,345 A * 12/1991 Goggia ............... F21S 8/02
362/153.1
7,889,505 B1 2/2011 Beard 2007/0140508 A1 * 6/2007 Soerensen ............ H04N 5/642
381/87
2012/0128194 A1 5/2012 Oh
2013/0081488 A1 4/2013 Oh

FOREIGN PATENT DOCUMENTS

| DE | 19534400 A1 | 3/1997 |
| DE | 10324640 B3 | 5/2004 |
| DE | 102005008469 A1 | 8/2006 |
| WO | 2005081520 A1 | 9/2005 |

OTHER PUBLICATIONS

Search report dated Jan. 22, 2015 of the corresponding European patent application No. 14171726.4.

* cited by examiner

*Primary Examiner* — Matthew Eason
(74) *Attorney, Agent, or Firm* — Chun-Ming Shih; HDLS IPR Services (57) ABSTRACT

A retractable speaker structure for use in a vehicle is provided. The retractable speaker structure includes: a case formed with a chamber; a driving member installed in the chamber and including a stepping motor and a transmission shaft connected to the stepping motor; a retracting mechanism disposed in the chamber and including a screw rod and a retractable rod fitted with the screw rod. The screw rod is driven by the transmission shaft to rotate, thereby enabling the retractable rod to perform a protruding/retracting movement relative to the screw rod; and a speaker secured at an end section of the retractable rod and moved with the retractable rod. Accordingly, the retractable speaker structure is able to be adjusted for being protruded or retracted according to the actual needs, thereby effectively simplifying components and lowering production cost.

9 Claims, 10 Drawing Sheets

RETRACTABLE SPEAKER STRUCTURE FOR USE IN A VEHICLE

BACKGROUND OF THE INVENTION

1. Field of the Invention

The present invention relates to a speaker structure, especially to a retractable speaker structure for use in a vehicle.

2. Description of Related Art

At present, the mainframe of an audio/video equipment is mainly mounted in a panel at the front side of a driver's seat, and the speaker is mounted in a vehicle door or the panel; because the speaker has directivity relative to the user, the mounting location of the speaker plays an important role regarding to the entertaining effect; for allowing the speaker to provide an excellent performance, the speaker has to be protrudingly installed on the panel or the vehicle door, however, the above-mentioned arrangement would cause the speaker to be more likely to be damaged.

As such, there is a retractable speaker structure available in the market, in which a motor is adopted for driving a retracting mechanism to move, and a speaker is secured at an end section of the retracting mechanism and moved with the retracting mechanism, thereby allowing the speaker to be selectively protruded out or refracted in the panel or the vehicle door according to the actual needs.

However, the motor adopted in the above-mentioned retractable speaker structure is mostly a synchronizing motor, and the synchronizing motor has properties of constant sped, no need for speed adjustment and requiring a smaller starting torque, so the retractable speaker structure is required to be additionally installed with a reducing gear and a location sensor for adjusting the rotation speed of the retracting mechanism and limiting the stroke of the retracting mechanism, thereby causing the retractable speaker structure requiring complicated components and having relatively higher production cost.

In view of the above-mentioned shortages, the applicant of the present invention has devoted himself for inventing a novel design to solve the above-mentioned shortages.

SUMMARY OF THE INVENTION

The present invention is to provide a retractable speaker structure for use in a vehicle, in which a stepping motor is adopted for driving a retracting mechanism to protrude or retract, so the retractable speaker structure is able to be adjusted for being protruded or retracted according to the actual needs, thereby effectively simplifying components and lowering production cost.

Accordingly, the present invention provides a retractable speaker structure for use in a vehicle, which includes:

a case, formed with a chamber;

a driving member, installed in the chamber and including a stepping motor and a transmission shaft connected to the stepping motor, wherein the stepping motor is fastened on the case and driven by the transmission shaft to rotate;

a retracting mechanism, disposed in the chamber and including a screw rod and a retractable rod fitted with the screw rod, wherein the screw rod is driven by the transmission shaft to rotate, thereby enabling the retractable rod to perform a protruding/retracting movement relative to the screw rod; and a speaker, secured at an end section of the retractable rod and moved with the retractable rod.

DETAILED DESCRIPTION OF THE INVENTION

Preferred embodiments of the present invention will be described with reference to the drawings.

Please refer from FIG. 1 to FIG. 6, the present invention provides a retractable speaker structure for use in a vehicle. According to a first embodiment of the present invention, the retractable speaker structure (10) mainly includes a case (1), a driving member (2), a retracting mechanism (3) and a speaker (4).

As shown in FIG. 1, FIG. 2, FIG. 3 and FIG. 5, the case (1) is substantially formed in a rectangular shape, and formed with a chamber (11). The case (1) is formed with a base (12) and a cover (13) correspondingly engaged with the base (12), and the chamber (11) is formed between the base (12) and the cover (13). Wherein, the cover (13) is formed with a penetrated hole (131) and a position limiting slot (132).

Figure 1:
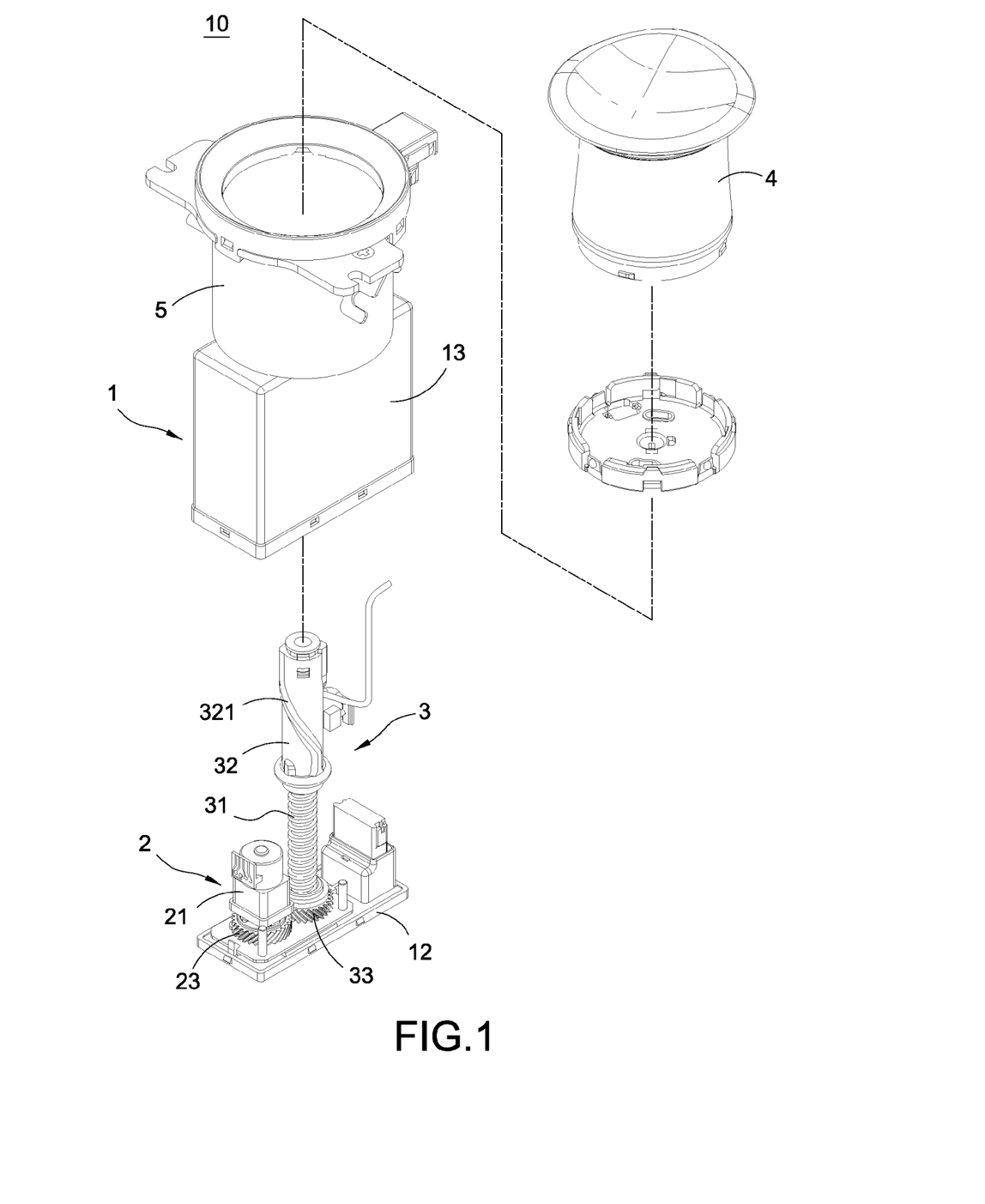
FIG. 1 is a perspective exploded view showing the retractable speaker structure according to a first embodiment of the present invention.
Figure 2:
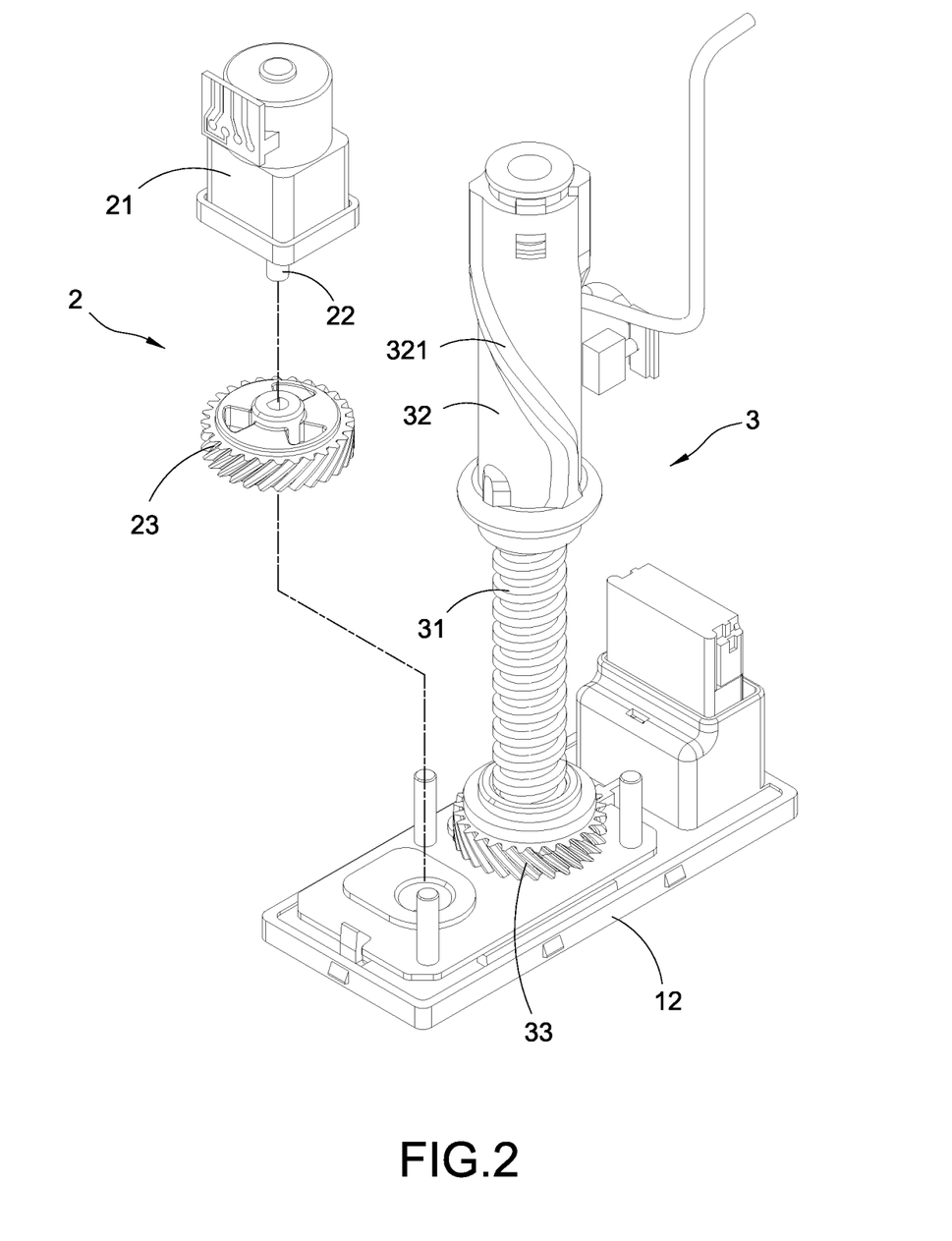
FIG. 2 is another perspective exploded view showing the retractable speaker structure according to the first embodiment of the present invention.
Figure 3:
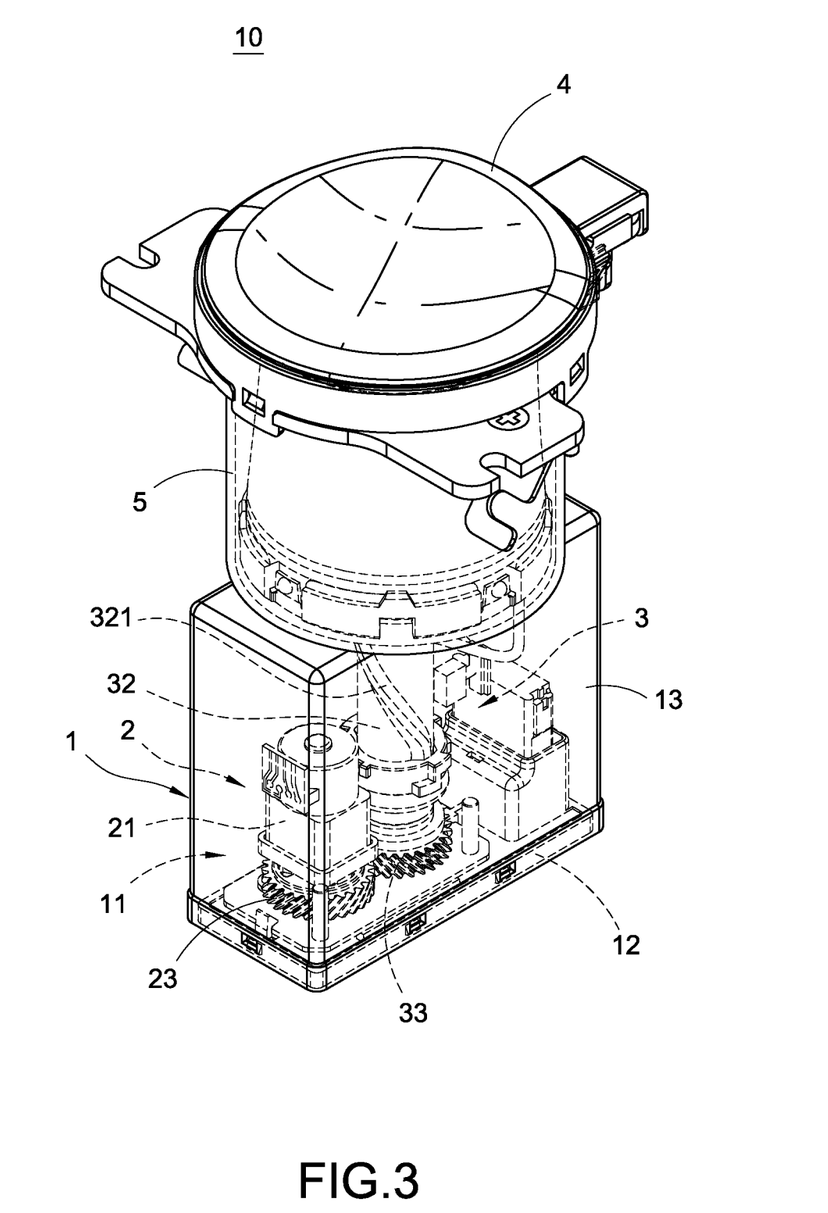
FIG. 3 is a perspective view showing the assembly of the retractable speaker structure according to the first embodiment of the present invention.
Figure 4:
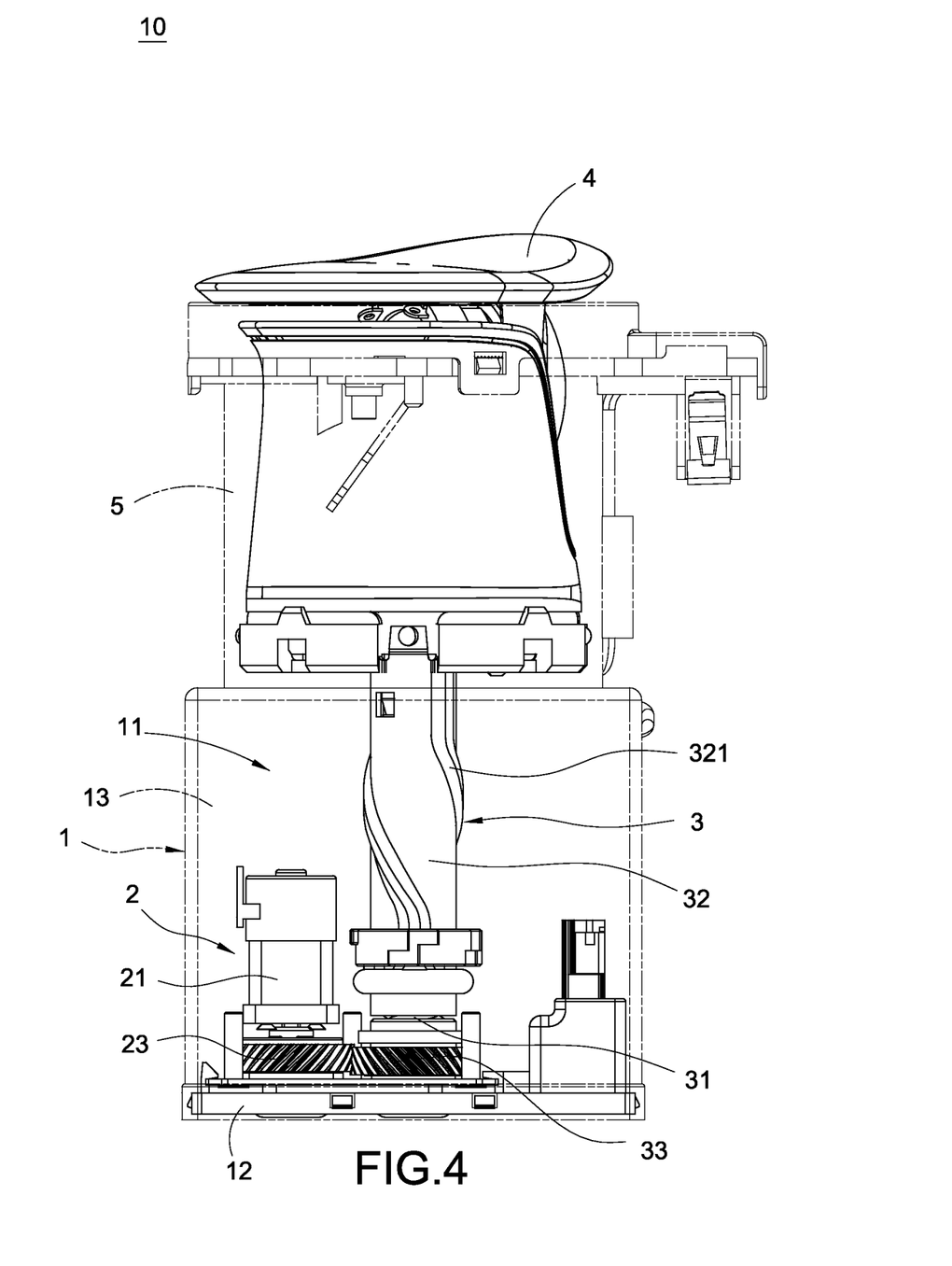
FIG. 4 is a schematic view showing the operating status of the retractable speaker structure according to the first embodiment of the present invention.
Figure 5:
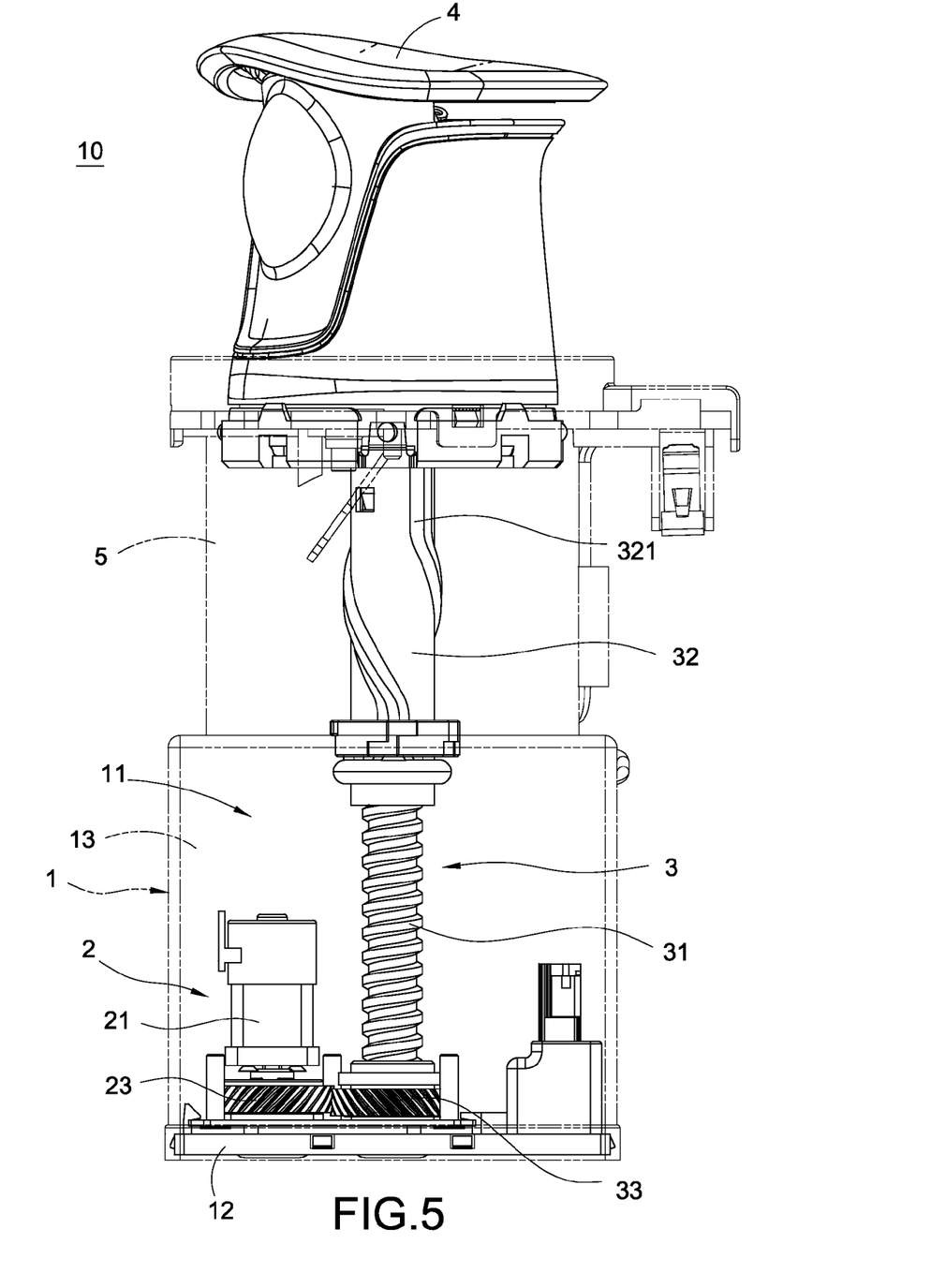
FIG. 5 is another schematic view showing the operating status of the retractable speaker structure according to the first embodiment of the present invention.
Figure 6:
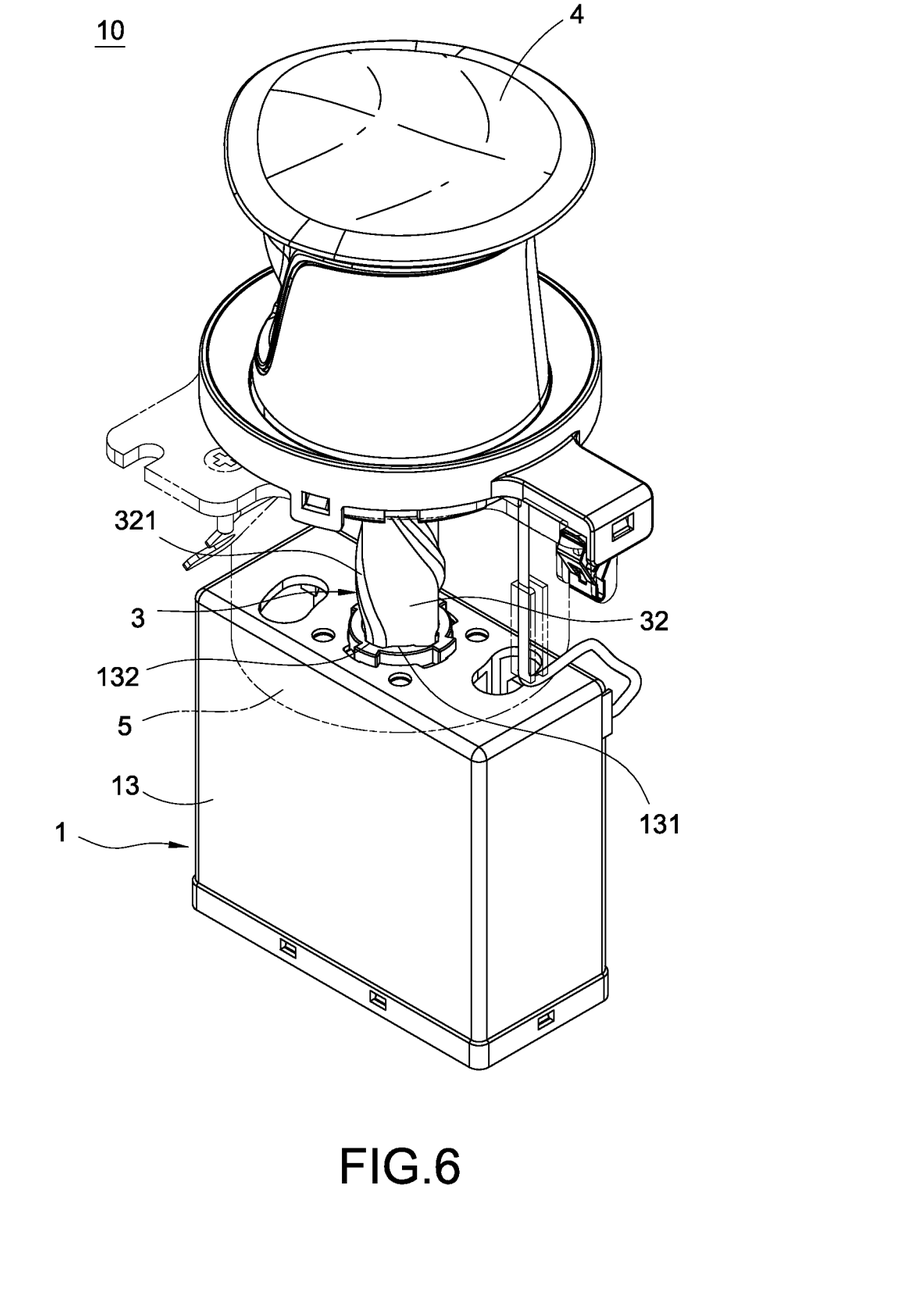
FIG. 6 is another perspective view showing the assembly of the retractable speaker structure according to the first embodiment of the present invention.

As shown from FIG. 1 to FIG. 3, the driving member (2) is installed in the chamber (11) and includes a stepping motor (21) and a transmission shaft (22) connected to the stepping motor (21), wherein the stepping motor (21) is fastened on the case (1) and served to drive the transmission shaft (22) to rotate.

A further illustration is that the driving member (2) further includes a transmission gear (23) sleeved on the transmission shaft (22) and rotated with the transmission shaft (22).

As shown from FIG. 1 to FIG. 3, the retracting mechanism (3) is disposed in the chamber (11), and includes a screw rod (31) and a retractable rod (32) fitted with the screw rod (31). The screw rod (31) is driven by the transmission shaft (22) to rotate, thereby enabling the retractable rod (32) to perform a protruding/retracting movement relative to the screw rod (31).

A further illustration is that one end of the screw rod (31) is disposed corresponding to the base (12), the other end thereof and the retractable rod (32) are both disposed corresponding to the penetrated hole (131), and the retractable rod (32) is formed with an inner thread segment, the screw rod (31) is able to be fitted with the retractable rod (32) through the above-mentioned inner thread segment. Wherein, the outer wall of the retractable rod (32) is protrudingly formed with a spiral guide rail (321) correspondingly received in the position limiting slot (132).

In addition, the retracting mechanism (3) further includes a passive gear (33) connected to an end section of the screw rod (31) and linked with the screw rod (31), thereby enabling the transmission gear (23) and the passive gear (33) to be mutually engaged for transmission.

As shown from FIG. 3 to FIG. 6, the speaker (4) is secured at the end section of the retractable rod (32) and moved with the retractable rod (32), and with the installation of the above-mentioned spiral guide rail (321) and the position liming slot (132), the speaker (4) is enabled to be protruded or retracted with a rotating means.

As shown from FIG. 1 to FIG. 3, the retractable speaker structure (10) provided by the present invention further includes a storage cylinder (5) fastened on the cover (13) and disposed corresponding to the retractable rod (32), thereby allowing the speaker (4) to be stored in or protruded out from the storage cylinder (5).

Please refer from FIG. 3 to FIG. 6, the assembly of the retractable speaker structure (10) is that: the case (1) is formed with the chamber (11); the driving member (2) is installed in the chamber (11) and includes the stepping motor (21) and the transmission shaft (22) connected to the stepping motor (22), wherein the stepping motor (21) is fastened on the case (1) and served to drive the transmission shaft (22) to rotate; the retracting mechanism (3) is disposed in the chamber (11) and includes the screw rod (31) and the retractable rod (32) fitted with the screw rod (31), the screw rod (31) is driven by the transmissions shaft (22) to rotate, thereby enabling the retractable rod (32) to perform the protruding/retracting movement relative to the screw rod (31); the speaker (4) is secured at the end section of the retractable rod (32) and moved with the retractable rod (32). Accordingly, by the stepping motor (21) driving the retracting mechanism (3) to protrude or retract, the retractable speaker structure (10) is able to be adjusted for being protruded or retracted according to the actual needs, thereby effectively simplifying components and lowering production cost.

Please refer from FIG. 3 to FIG. 6, which disclose the operating status of the retractable speaker structure (10) provided by the present invention; when the retractable speaker structure (10) is installed in a vehicle and the speaker (4) is not in use, the speaker (4) is stored and hidden in the storage cylinder (5); when the speaker (4) is desired to be used, the stepping motor (21) drives the transmission shaft (22) to rotate, the transmission shaft (22) drives the transmission gear (23) to rotate, then the transmission gear (23) drives the passive gear (33) for enabling the screw rod (31) to rotate, because the inner thread segment of the retractable rod (32) is fitted with the screw rod (31), the retractable rod (32) is pushed by the screw rod (31) for being ascended, thereby allowing the speaker (4) to be ascended from the storage cylinder (5), and because the spiral guide rail (321) of the retractable rod (32) is limited by the position limiting slot (132), when the speaker (4) is pushed by the retractable rod (32) for being ascended from the storage cylinder (5), the speaker (4) is enabled to be rotated and ascended along with the spiral guide rail (321). In addition, the position limiting slot (132) is matched with the shape of the spiral guide rail (321), so the retractable rod (32) is able to be smoothly rotated for being ascended thereby avoiding the situation of unsmooth ascend or even being jammed. Moreover, when the speaker (4) is desired to be descended for being stored in the storage cylinder (5), the stepping motor (21) just reversely rotates for driving the transmission shaft (22) to rotate.

Wherein, the stepping motor (21) is one type of pulse motor, which is a motor gradually rotating with a certain angle, and an open loop is adopted for controlling, so a precise control of position and speed can be achieved without a feedback device for detecting location and speed. As such, the retractable speaker structure (10) provided by the present invention does not require a reducing gear nor a location sensor, and the rotation speed of the retractable rod (32) can still be effectively and stably controlled and the stroke of the retractable rod (32) can also be precisely limited, thereby allowing the retractable speaker structure (10) to be provided with advantages of simplifying components and lowering production cost.

Figure 7:
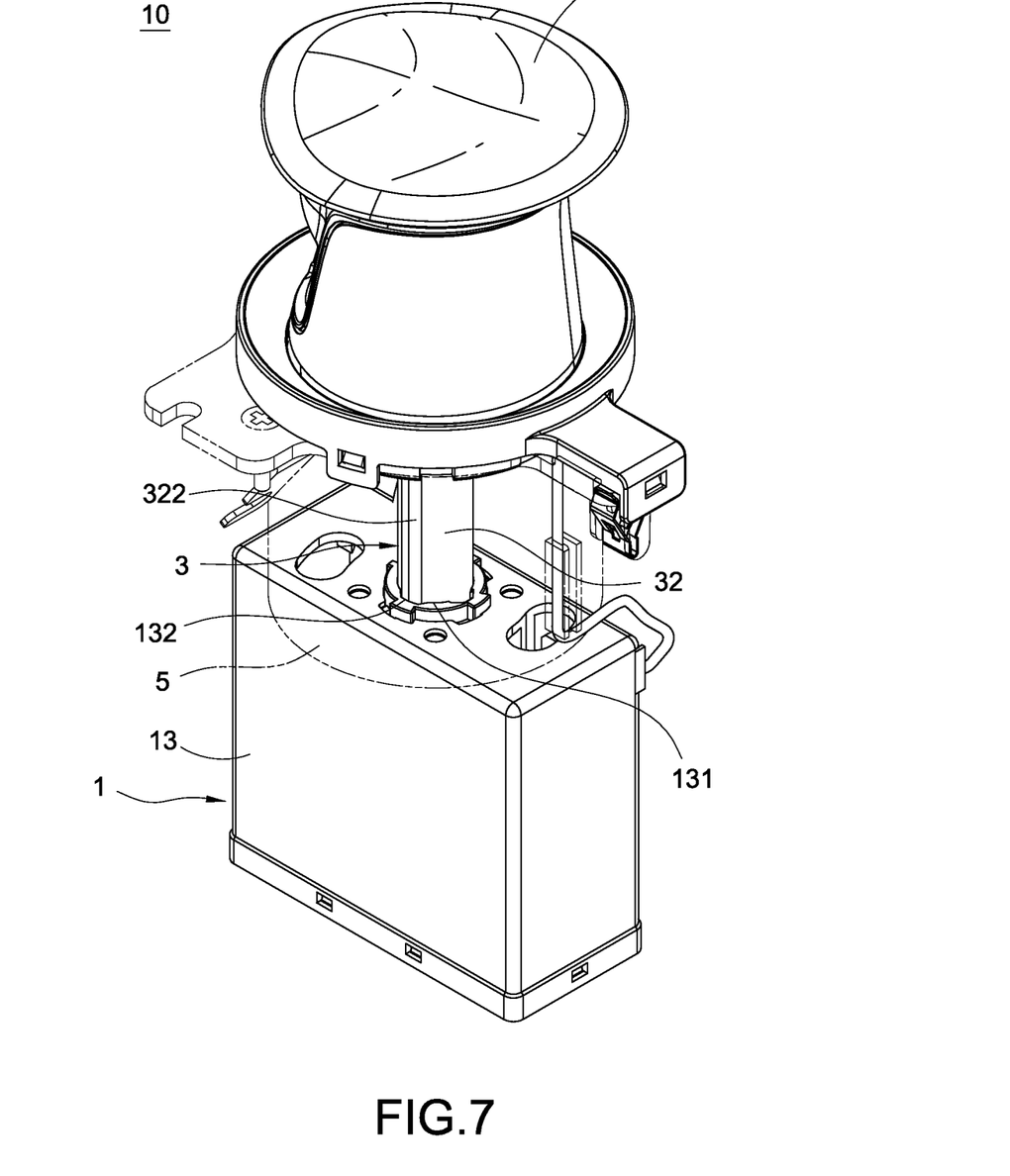
FIG. 7 is a perspective view showing the assembly of the retractable speaker structure according to a second embodiment of the present invention.

Please refer to FIG. 7, which discloses a second embodiment illustrating the retractable speaker structure (10) provided by the present invention. The second embodiment is substantially the same as the first embodiment, and the difference between the two is that the outer wall of the retractable rod (32) is protrudingly formed with a linear guide rail (322).

A further illustration is that the outer wall of the retractable rod (32) is formed with the linear guide rail (322), the cover (13) is formed with a position limiting slot (132) allowing the linear guide rail (322) to be received therein, and the retractable rod (32) is disposed corresponding to the above-mentioned penetrated hole (131), the linear guide rail (322) is mutually positioned with the position limiting slot (132), thereby enabling the speaker (4) to be protruded or retracted with a linearly moving means, and the same function and effect as the first embodiment can be provided.

Figure 8:
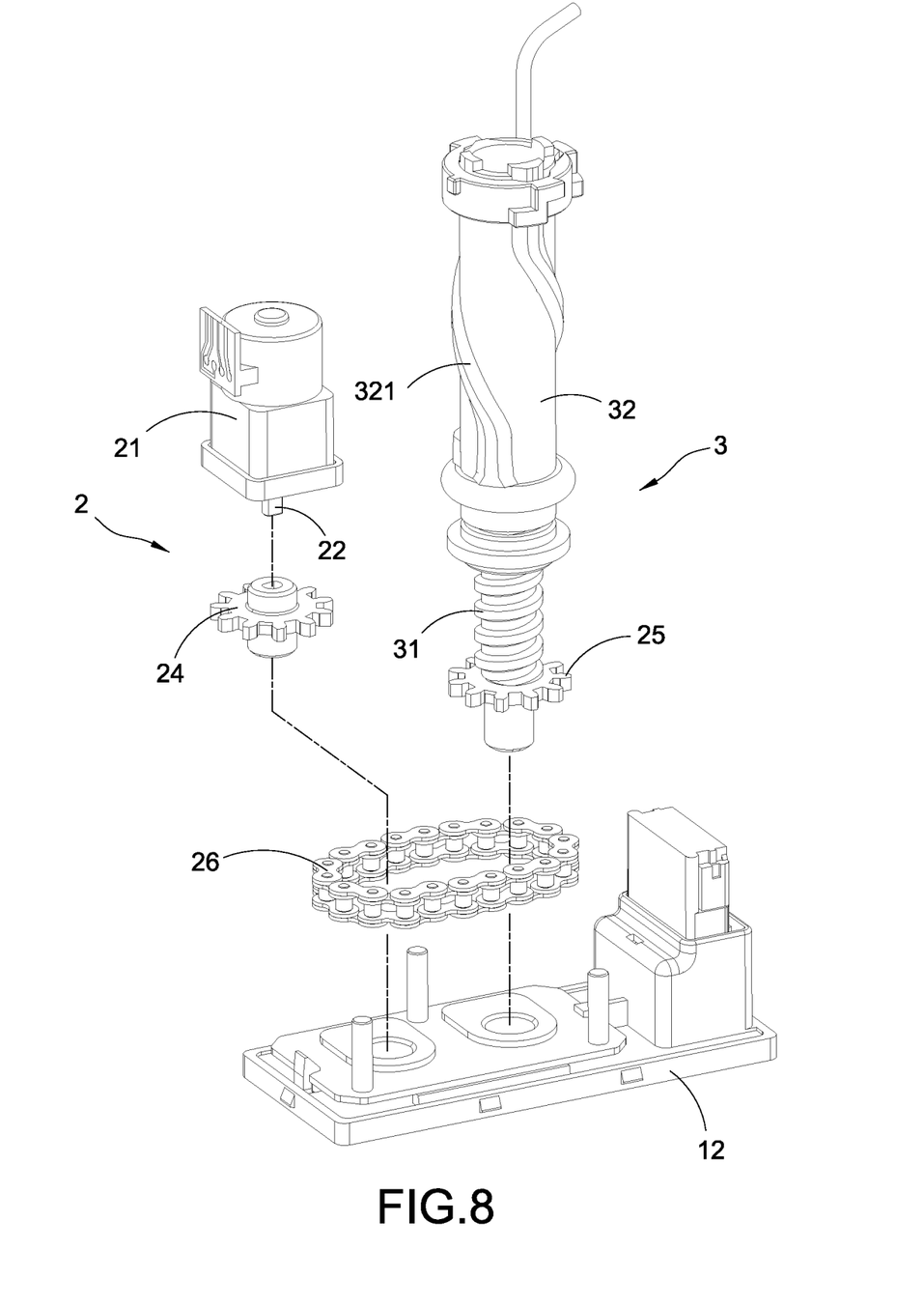
FIG. 8 is a perspective exploded view showing the retractable speaker structure according to a third embodiment of the present invention.

Please refer to FIG. 8, which discloses a third embodiment illustrating the retractable speaker structure (10) provided by the present invention. The third embodiment is substantially the same as the first embodiment, and the difference between the two is the configuration of the driving member (2), so the screw rod (31) is able to be driven by the transmission shaft (22) to rotate with a different means.

A detail illustration is that the driving member (2) further includes a first gear (24), a second gear (25) and a transmission chain (26); the first gear (24) is sleeved on the transmission shaft (22) and rotated with the transmission shaft (22), the second gear (25) is connected to the end section of the screw rod (31) and linked with the screw rod (31), and the transmission chain (26) is sleeved at the outer side of the first gear (24) and the second gear (25) and mutually engaged with the first gear (24) and the second gear (25) for transmission, so when the transmission shaft (22) is rotated, the transmission shaft (22) is able to drive the screw rod (31) to rotate through the first gear (24), the transmission chain (26) and the second gear (25) being mutually engaged. Accordingly, the same function and effect as the first embodiment can be provided.

Figure 9:
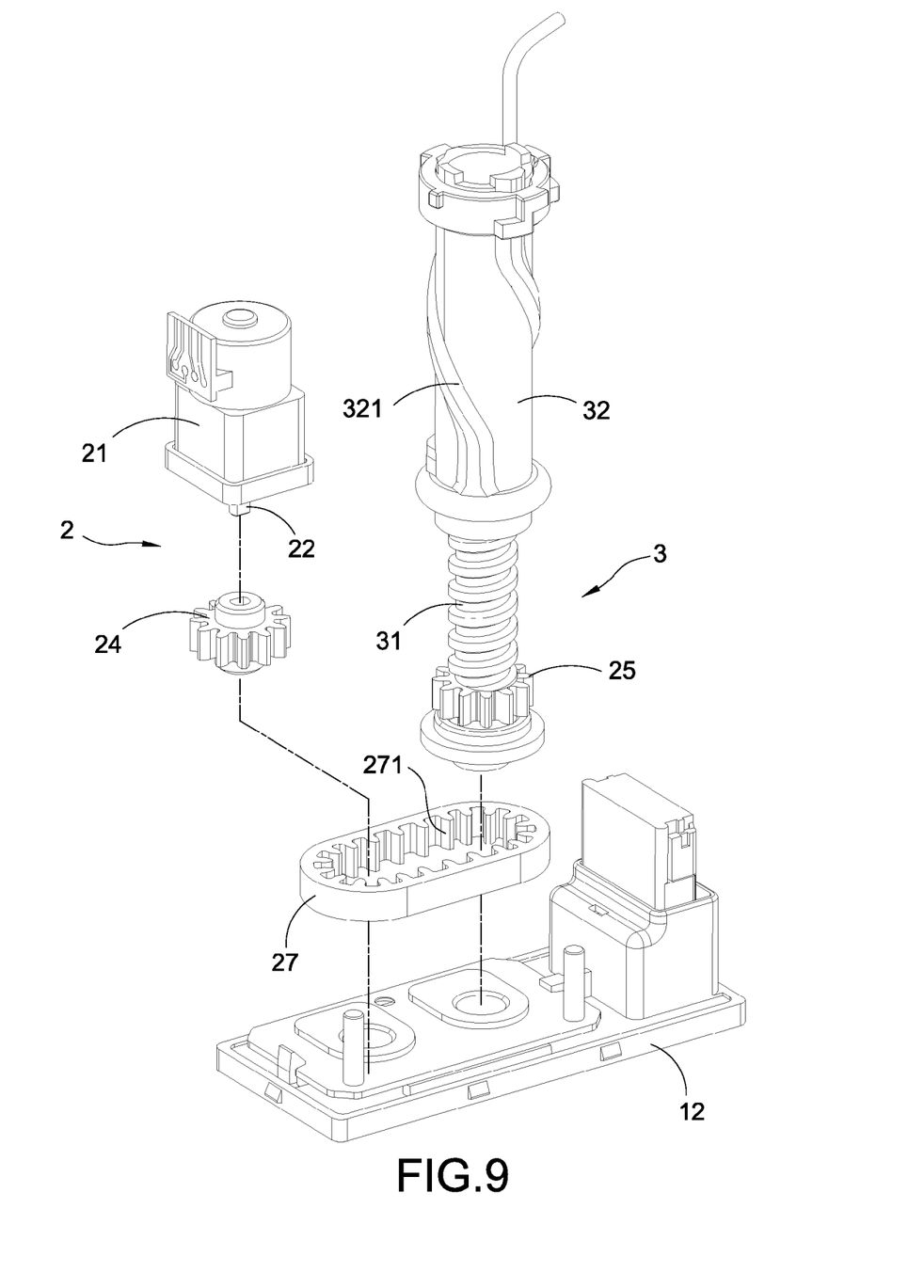
FIG. 9 is a perspective exploded view showing the retractable speaker structure according to a fourth embodiment of the present invention.

Please refer to FIG. 9, which discloses a fourth embodiment illustrating the retractable speaker structure (10) provided by the present invention. The fourth embodiment is substantially the same as the first embodiment, and the difference between the two is the configuration of the driving member (2), so the screw rod (31) is able to be driven by the transmission shaft (22) to rotate with a different means.

A further illustration is that the driving member (2) further includes a first gear (24), a second gear (25) and a transmission belt (27); the first gear (24) is sleeved on the transmission shaft (22) and rotated with the transmission shaft (22), the second gear (25) is connected to the end section of the screw rod (31) and linked with the screw rod (31), and the inner wall of the transmission belt (27) is extended with an inner gear (271), the transmission belt (27) is sleeved at the outer side of the first gear (24) and the second gear (25), and the inner gear (271) is mutually engaged with the first gear (24) and the second gear (25) for transmission, so when the transmission shaft (22) is rotated, the transmission shaft (22) is able to drive the screw rod (31) to rotate through the first gear (24), the inner gear (271) and the second gear (25) being mutually engaged. Accordingly, the same function and effect as the first embodiment can be provided.

Figure 10:
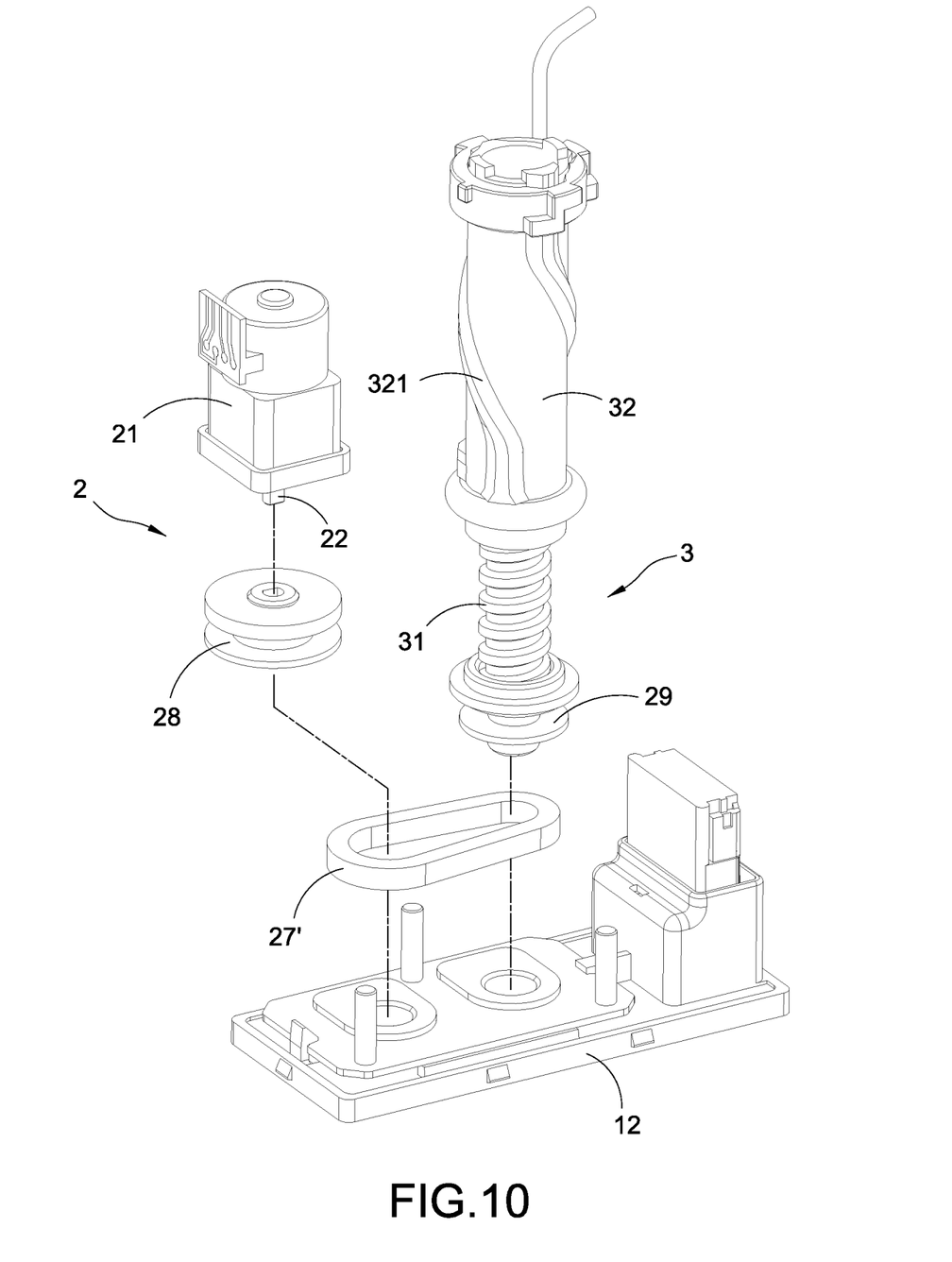
FIG. 10 is a perspective exploded view showing the retractable speaker structure according to a fifth embodiment of the present invention.

Please refer to FIG. 10, which discloses a fifth embodiment illustrating the retractable speaker structure (10) provided by the present invention. The fifth embodiment is substantially the same as the first embodiment, and the difference between the two is the configuration of the driving member (2), so the screw rod (31) is able to be driven by the transmission shaft (22) to rotate with a different means.

A detail illustration is that the driving member (2) further includes a first passive wheel (28), a second passive wheel (29) an a transmission belt (27'); the first passive wheel (28) is sleeved on the transmission shaft (22) and rotated with the transmission shaft (22), the second passive wheel (29) is connected to the end section of the screw rod (31) and linked with the screw rod (31), and the transmission belt (27') is tightly sleeved at the outer side of the first passive wheel (28) and the second passive wheel (29), so when the first passive wheel (28) is rotated, a friction force is generated between the transmission belt (27'), the first passive wheel (28) and the second passive wheel (29) thereby driving the second passive wheel (29) to rotate.

As such, when the transmission shaft (22) is rotated, the transmission shaft (22) is able to drive the screw rod (31) to rotate through the friction force generated between the first passive wheel (28), the transmission belt (27') and the second passive wheel (29). Accordingly, the same function and effect as the first embodiment can be provided.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A retractable speaker structure for use in a vehicle, including:
    a case (1), formed with a base (12), a cover (13) correspondingly engaged with the base (12), and a chamber (11) formed between the base (12) and the cover (13);
    a driving member (2), installed in the chamber (11) and including a stepping motor (21) and a transmission shaft (22) connected to the stepping motor (21), wherein the stepping motor (21) is fastened on the case (1) and drives the transmission shaft (22) to rotate;
    a retracting mechanism (3), disposed in the chamber (11) and including a screw rod (31) and a retractable rod (32) fitted with the screw rod (31), wherein the screw rod (31) is driven by the transmission shaft (22) to rotate, thereby enabling the retractable rod (32) to perform a protruding/retracting movement relative to the screw rod (31);
    a speaker (4), secured at an end section of the retractable rod (32) and moved with the retractable rod (32);
    a storage cylinder (5) fastened on the cover (13) and disposed corresponding to the retractable rod (32), thereby allowing the speaker (4) to be stored in or protruded out from the storage cylinder (5).

2. The retractable speaker structure for use in a vehicle according to claim 1, wherein the driving member (2) further includes a transmission gear (23) sleeved on the transmission shaft (22) and rotated with the transmission shaft (22); the retracting mechanism (3) further includes a passive gear (33) connected to an end section of the screw rod (31) and linked with the screw rod (31), thereby enabling the transmission gear (23) and the passive gear (33) to be mutually engaged for transmission.

3. The retractable speaker structure for use in a vehicle according to claim 1, wherein the driving member (2) further includes a first gear (24), a second gear (25) and a transmission chain (26); the first gear (24) is sleeved on the transmission shaft (22) and rotated with the transmission shaft (22), the second gear (25) is connected to an end section of the screw rod (31) and linked with the screw rod (31), and the transmission chain (26) is sleeved at an outer side of the first gear (24) and the second gear (25) and mutually engaged with the first gear (24) and the second gear (25) for transmission.

4. The retractable speaker structure for use in a vehicle according to claim 1, wherein the driving member (2) further includes a first gear (24), a second gear (25) and a transmission belt (27); the first gear (24) is sleeved on the transmission shaft (22) and rotated with the transmission shaft (22), the second gear (25) is connected to an end section of the screw rod (31) and linked with the screw rod (31), and an inner wall of the transmission belt (27) is extended with an inner gear (271), the transmission belt (27) is sleeved at an outer side of the first gear (24) and the second gear (25), and the inner gear (271) is mutually engaged with the first gear (24) and the second gear (25) for transmission.

5. The retractable speaker structure for use in a vehicle according to claim 1, wherein the driving member (2) further includes a first passive wheel (28), a second passive wheel (29) and a transmission belt (27'); the first passive wheel (28) is sleeved on the transmission shaft (22) and rotated with the transmission shaft (22), the second passive wheel (29) is connected to an end section of the screw rod (31) and linked with the screw rod (31), and the transmission belt (27') is tightly sleeved at an outer side of the first passive wheel (28) and the second passive wheel (29).

6. The retractable speaker structure for use in a vehicle according to claim 1, wherein the cover (13) is formed with a penetrated hole (131), one end of the screw rod (31) is disposed corresponding to the base (12), and the other end thereof and the retractable rod (32) are both disposed corresponding to the penetrated hole (131).

7. The retractable speaker structure for use in a vehicle according to claim 1, wherein an outer wall of the retractable rod (32) is protrudingly formed with a spiral guide rail (321), and the cover (13) is formed with a position limiting slot (132) allowing the spiral guide rail (321) to be received therein.

8. The retractable speaker structure for use in a vehicle according to claim 1, wherein an outer wall of the retractable rod (32) is protrudingly formed with a linear guide rail (322), and the cover (13) is formed with a position limiting slot (132) allowing the linear guide rail (322) to be received therein.

9. The retractable speaker structure for use in a vehicle according to claim 1, wherein the retractable rod (32) is formed with an inner thread segment, and the screw rod (31) is able to be fitted with the retractable rod (32) through the inner thread segment.

* * * * *